US012063297B2

(12) United States Patent
Kenney et al.

(10) Patent No.: US 12,063,297 B2
(45) Date of Patent: Aug. 13, 2024

(54) DETERMINISTIC POWER AND RATE CONTROL

(71) Applicant: L3Harris Technologies, Inc., Melbourne, FL (US)

(72) Inventors: Brent A. Kenney, Bountiful, UT (US); Matthew J. Reimann, Draper, UT (US); Brian J. Thorp, Sandy, UT (US); Patrick L Newbold, Draper, UT (US); Christopher S. Heffernan, South Jordan, UT (US); Philip M. Hirz, Holladay, UT (US); Marc Padilla, Farmington, UT (US); Michael S. Feeney, Farmington, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 521 days.

(21) Appl. No.: 17/322,474

(22) Filed: May 17, 2021

(65) Prior Publication Data
US 2022/0368523 A1     Nov. 17, 2022

(51) Int. Cl.
| | |
|---|---|
| *H04L 9/08* | (2006.01) |
| *H04B 17/10* | (2015.01) |
| *H04B 17/327* | (2015.01) |
| *H04W 52/36* | (2009.01) |
| *H04W 84/18* | (2009.01) |

(52) U.S. Cl.
CPC ......... *H04L 9/0852* (2013.01); *H04B 17/102* (2015.01); *H04B 17/327* (2015.01); *H04W 52/367* (2013.01); *H04W 84/18* (2013.01)

(58) Field of Classification Search
CPC .. H04B 17/102; H04B 17/327; H04W 52/367
See application file for complete search history.

(56) References Cited

U.S. PATENT DOCUMENTS

| | | |
|---|---|---|
| 7,693,119 B2 | 4/2010 | Lee et al. |
| 10,181,972 B1 | 1/2019 | Giallorenzi et al. |
| 10,772,050 B1 | 9/2020 | Kenney et al. |
| (Continued) | | |

FOREIGN PATENT DOCUMENTS

WO     2016/186752 A1     11/2016

OTHER PUBLICATIONS

European Search Report received for EP Patent Application No. 22171068.4, mailed on Oct. 5, 2022, 8 pages.
(Continued)

*Primary Examiner* — Matthew T Henning
(74) *Attorney, Agent, or Firm* — Workman Nydegger (57) ABSTRACT

Indicating to a receiver node in a network that the receiver node should begin tracking signal to noise ratio (SNR) of a received signal for a new power and rate (PAR) interval for data sent from a transmitter node. A method includes determining that a new PAR interval is beginning. The method further includes adding an identifier to a data block. The identifier corresponds to the new PAR interval. The method further includes sending the data block from the transmitter node to the receiver node, where the receiver node will use the identifier to determine that a new tracking interval of SNR should be performed for the data block and subsequent data blocks having the identifier.

20 Claims, 4 Drawing Sheets

(56) References Cited

U.S. PATENT DOCUMENTS

2019/0150005 A1    5/2019  Cendrillon
2020/0107275 A1*   4/2020  Cho .................... H04W 52/50

OTHER PUBLICATIONS

Decision to grant received for European Patent Application No. 22171068.4, mailed on Nov. 23, 2023, 2 pages.
Intention to grant received for European Patent Application No. 22171068.4, mailed on Oct. 13, 2023, 7 pages.

* cited by examiner

DETERMINISTIC POWER AND RATE CONTROL

BACKGROUND

Background and Relevant Art

Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Some computing systems communicate using ad-hoc mesh networks, which are typically wireless decentralized networks where the various nodes in the mesh network identify neighbor nodes to add to the network. One example of such a network is a code division multiple access (CDMA) mobile ad-hoc network (MANET).

Often, mesh networks may be implemented in a contested environment where communication of desired signals is hampered due to the presence of interference, including intentional jamming interference, ambient noise, unintentionally interfering systems such as cell towers, etc. To ensure that communications can be properly received, systems attempt to transmit signals that will be received by a receiver at a target signal-to-noise ratio (SNR). The SNR is often expressed as $E_b/N_0$, where $E_b$ is the energy per bit, and $N_0$ is the noise power spectral density, which is noise power at the remote receiver node divided by a spread bandwidth. Achieving this target SNR, or at least an acceptable SNR can be accomplished using feedback from receivers in the mesh network. In particular, the receivers will measure a SNR of a received signal and provide feedback to a transmitter transmitting the signal. The transmitter can then adjust the power and the data rate, often times referred to herein as PAR or power and rate, at which the signal is being transmitted to attempt to achieve a target SNR or acceptable SNR.

For the feedback to be most effective, it is important that the measured SNR is able to be correlated with a known PAR. That is, for the transmitter to make appropriate adjustments to PAR it is useful to know the PAR at which the signal was sent and to be able to correlate that with the SNR where the signal is received. PAR control is a task that relies heavily on accurate SNR feedback, especially in highly dynamic scenarios where PAR can change drastically as link conditions and user demands change.

Previously, to accomplish this functionality, a receiver was required to make a determination of when the PAR changes occurred at the transmitter. Note that rate changes are easy to detect, but a rate change does not necessarily mark a change in a tracking interval for determining SNR, as PAR changes can be made in concert to maintain the same effective ratio. Also, power changes are extremely difficult to detect since there could be changes in the link attenuation or antenna gains in addition to changes in the transmitter power. Some systems use synchronized timing schemes to coordinate PAR tracking intervals.

In other systems, the power and rate values are included in header messages. However, this practice increases the overhead beyond what is needed, especially when the header is sent at a reduced rate from the payload data.

However, it would be useful to allow for asynchronous protocols to be used but to nonetheless have the ability to correlate measured SNR with PAR of a transmitted signal.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for indicating to a receiver node in a network that the receiver node should begin tracking signal to noise ratio (SNR) of a received signal for a new power and rate (PAR) interval for data sent from a transmitter node. The method includes determining that a new PAR interval is beginning. The method further includes adding an identifier to a data block. The identifier corresponds to the new PAR interval. The method further includes sending the data block from the transmitter node to the receiver node, where the receiver node will use the identifier to determine that a new tracking interval of SNR should be performed for the data block and subsequent data blocks having the identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein facilitate the correlation of a measured SNR with PAR of a transmitted signal by including an identifier in payload data at the transmitter where the payload data is then sent to a receiver. The identifier can be used instead of explicitly including the power and rate in the data for conciseness. Note that inasmuch as the identifier is included in the payload data, this means that the identifier, in many embodiments, will be covered by forward error correction (FEC) schemes as well as encryption of the payload data. In some examples, data is transmitted in a data stream that includes data blocks where each data block includes a header (which in some embodiments may be a variable length format header) followed by a payload block. Some embodiments illustrated herein may be implemented where the first byte of payload data in the payload block occurring immediately after the header comprises the identifier.

Some embodiments find technical advantage in that in examples illustrated herein, a generator of the PAR message (a red side) is decoupled from the application of the power and rate change in the physical waveform (black side) because of a crypto interface sitting between them. Due to decoupling of red/black sides, the red side does not know exactly when its own transmitter is changing power and rate, such that the PAR message being sent may arrive before or after the actual power and rate were applied by the waveform. When the PAR message could be synchronized with the waveform power and rate change, then this would not be necessary. The uncertainty of not knowing when power and rate were applied leads to inaccurate SNR accumulation of the receiver. Indeed, the more latency/jitter there is between the controller of the power and rate and the application of that commanded power and rate, the more useful the embodiments described herein become.

Figure 1:
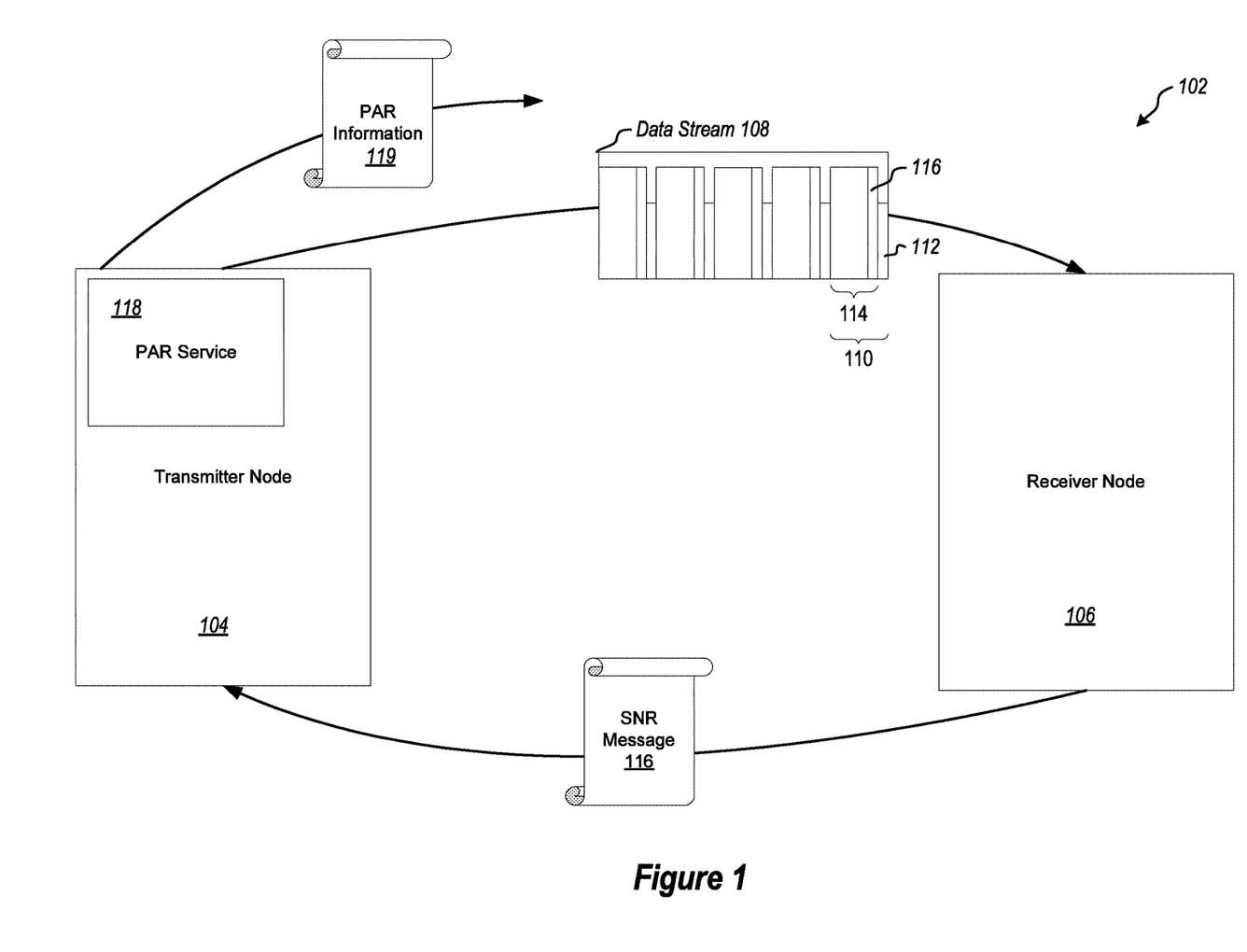
FIG. 1 illustrates half of a bidirectional link between two nodes, forming a portion of a network.

Referring now to FIG. 1, an example is illustrated. FIG. 1 illustrates a single side of a bidirectional link between two nodes, forming a portion of an ad hoc network 102. In this particular example two nodes are illustrated. In particular a transmitter node 104 is illustrated transmitting messages to a receiver node 106. Note that while in this example the transmitter node 104 and receiver node 106 are so designated, it should be appreciated that the nodes can each be the transmitter or receiver nodes depending on the circumstances. Indeed, the receiver node 106 may be a transmitter node for transmitter node 104 acting as a receiver node. In the example illustrated, the transmitter node 104 sends a data stream 108 to the receiver node 106. In this example, the data stream 108 includes a plurality of data blocks, such as data block 110.

Each data block includes a header 112 and a payload block 114. In some embodiments, power and/or rate changes are only allowed at the beginning of a payload block 114. In the example illustrated herein, the payload block 114 includes a quantum of data 116 which includes the identifier that corresponds to a specific power and rate combination. The identifier arrives at the receiver node 106 at the beginning of the same data block where the new power and rate are set. As discussed previously, in some embodiments the quantum of data 116 may be the first byte of data following the header 112. However, in other embodiments, the quantum of data 116 may be another easily identified byte or other quantity of data located as some other location in the payload block.

As noted previously, the payload block 114 is often covered by encryption and/or FEC by the transmitter node 104, and in particular by cryptographic software and hardware at the transmitter node 104. At the receiver node 106, the receiver node 106 is able to perform various error correction operations as well as various decryption operations to identify the identifier in the quantum of data 116.

As discussed previously, embodiments illustrated herein are directed to managing the PAR at which data is sent from the transmitter node 104 to the receiver node 106. As part of this management, the receiver node 106 can measure a SNR of data received at the receiver node 106. However, to allow the transmitter node 104 to accurately control the PAR at which data is sent, the receiver node 106 needs to be able to facilitate correlation of PAR with the measured SNR.

This is typically accomplished by the receiver node 106 tracking SNR information over a tracking interval that is referred to herein as a PAR interval. That is, the receiver node 106 will attempt to track the SNR for data received from the transmitter node 104 during a so-called PAR interval where the transmitter node 104 attempts to keep consistency in the PAR interval. In the examples illustrated herein, the transmitter node 104 will attach the same identifier to all payload blocks in a given PAR interval. Tracking SNR, as used herein can refer to any one of a number of operations including: identifying a minimum SNR, identifying a maximum SNR, identifying a median SNR, identifying an average SNR, etc. or combinations thereof. Note that while the receiver node 106 is shown tracking SNR for a particular transmitter node 104, in other embodiments, the receiver node may track SNR for a plurality of asynchronous transmitter nodes.

When the transmitter node 104 changes PAR, a new identifier is used. This new identifier can then be detected by the receiver node 106 and can be used by the receiver node 106 in a different SNR tracking operation such that SNR accumulation at the receiver node 106 can be performed on a PAR interval basis.

Note that a given PAR interval may have certain variables associated with it with respect to PAR but nonetheless be a same PAR interval. For example, if the transmitter node 104 is in a state where power must be reduced, the transmitter node 104 can cause a corresponding reduction in the rate to attempt to achieve a target SNR consistent with a given PAR interval. Similarly, if the transmitter node 104 is in a state where rate needs to be increased, the transmitter node 104 can cause a corresponding increase in power used to send the data stream 108 data in the data stream 108 to attempt to maintain a same SNR for the PAR interval. These changes may nonetheless be marked as occurring in the same PAR interval causing the receiver node 106 to accumulate and average SNR for data blocks 110 in the same tracking interval to accumulate SNR for a particular PAR interval.

Returning once again to FIG. 1, the receiver node 106 sends an SNR message 116 to the transmitter node 104. In the example illustrated in FIG. 1, the transmitter node 104 includes a PAR service 118. The PAR service can use the information from the SNR message 116 to inform the transmitter node 104 of the need to increase or decrease power and/or increase or decrease rate to achieve a certain SNR at the receiver node 106. Thus, for example, the transmitter node 104 may transmit wireless communications to the receiver node 106, and can as a result of the SNR message 116 cause radio hardware in the transmitter node 104 to increase or decrease power and/or rate for those wireless communications. FIG. 1 further illustrates that the transmitter node 104 can send PAR information 119 to other nodes in the network including the receiver node 106 or other nodes not shown. Such PAR information could include the PAR at which the transmitter node 104 sends messages, SNRs measured by other nodes in the network, and/or other information. Such PAR information also includes the identifier included in the quantum of data. As a result, the PAR information associates the power and rate setting for the PAR interval with the identifier. When the receiver node 106 sends the SNR message 116, it includes the rate information, which is useful to other nodes not shown in FIG. 1.

As noted previously, the identifier included in the quantum of data 116 is typically encrypted by an encryption scheme at the transmitter node 104 as well as being covered by FEC operations. Typically, the various nodes in the network include hardware and software which carry data in plaintext format that can be readily read (often referred to as the red side) and encrypted hardware and software which carry data in cyphertext formats that cannot be readily accessed or read without certain decryption operations (often referred to as the black side). As such, embodiments may need to perform various correlation activities between the red sides and the black sides of transmitters and receivers to ensure that identifiers are properly included in the quantum of data in the payload block and properly recovered at the receiver node 106. Thus, the following figures include an explanation describe how red side and black side coordination on transmitter and receiver nodes.

Figure 2:
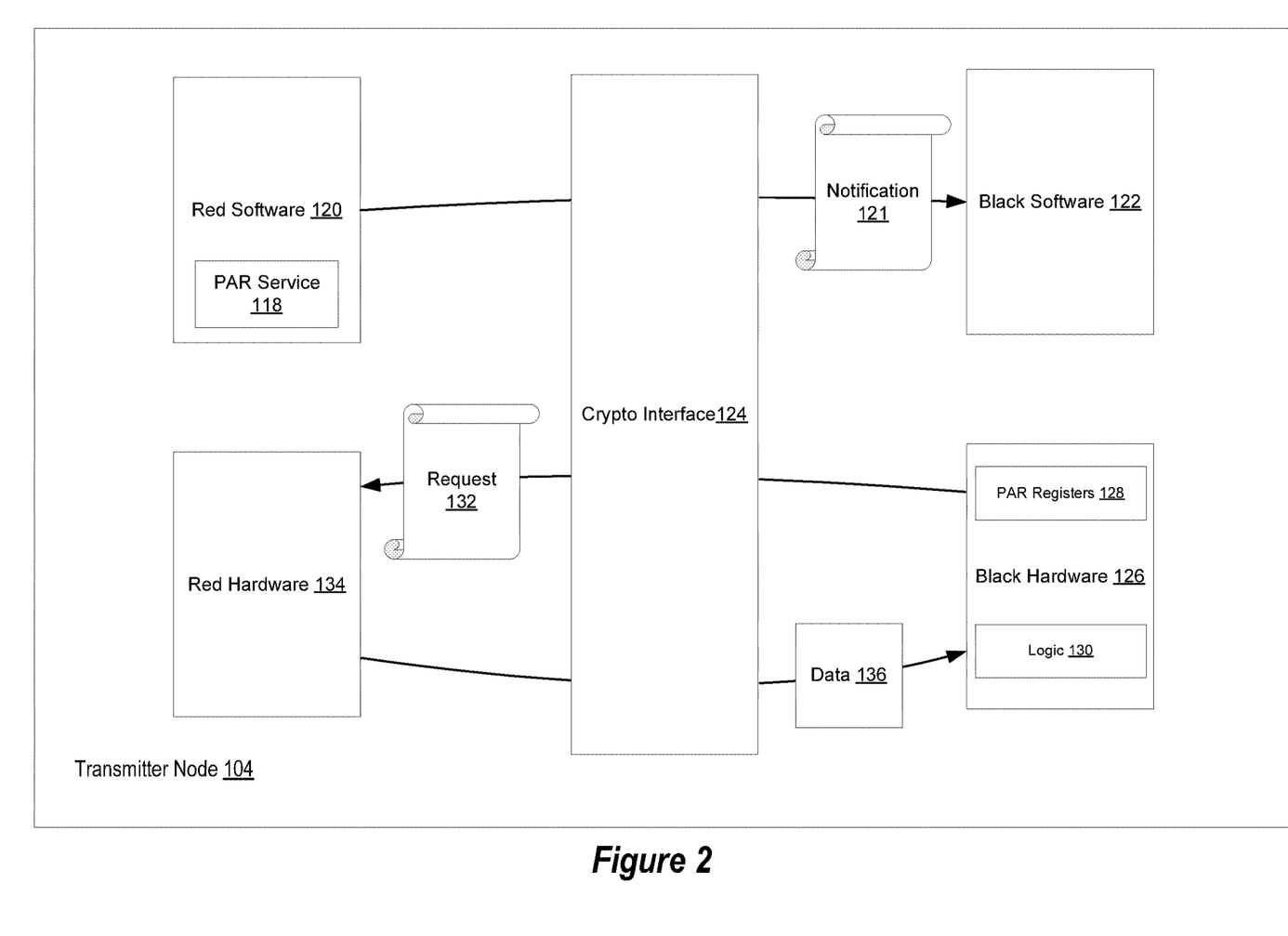
FIG. 2 illustrates a transmitter node.

FIG. 2 illustrates additional details with respect to the transmit side of an operation. For example, FIG. 2 illustrates additional details with respect to the transmitter node 104. On the transmitter node 104 side, the identifier is sent by the red side at the beginning of each payload block (e.g., see payload block 114 in FIG. 1), and is encrypted and covered by the payload FEC. This requires the black side, which controls encrypting and sending the payload blocks, to coordinate with the red side, which controls the data in the payload blocks.

Note that the payload FEC is more efficient in terms of rate than the header (e.g., header 112), resulting in less overhead by including the identifier in the quantum of data 116 in the payload block 114 as opposed to including the identifier in the header. Similarly, including only the identifier, as opposed to the full power and rate combination, provides for efficiencies in overhead. Indeed, in some embodiments, even more efficiencies can be realized where those embodiments implement multiple antenna systems (such as an antenna on top of an aircraft and on bottom of an aircraft, each transmitting the same data in the data stream 108), where each antenna in the system transmits at an individualized power. In this case a single identifier can represent multiple powers and rates.

Illustrating now additional details, red software 120 (and in particular in the PAR service 118) notifies the black software 122 through the crypto interface 124 of a power and/or rate change that results in a new PAR interval. For example, in some embodiments, this may be accomplished using a notification service to provide the notification 121 of a power change, including an indication of a target transmit power. The service may be a publication/subscription service where the black software 122 can subscribe to topics related to power and/or rate changes. Thus, when the PAR service 118 determines to change power of the data stream 108, a notification can be published to subscribers, such as the software applications in the black software 122. Other services can be used alternatively or additionally. Essentially, any service that is able to provide a communication framework between the red and black sides can be used. Note that as used herein, software refers to the applications running on computer hardware to implement the desired functionality. Thus, although software is referred to, it should be appreciated that the software is implemented in the context of computer hardware executing computer executable instructions to implement the functionality.

As illustrated in FIG. 2, the black software 122 includes waveform control software that latches changes (including changes in power, rate and an identifier) into black hardware 126, such as into the PAR registers 128, where hardware logic 130 can use the PAR information to control transmission of the data stream 108. In this example, the black hardware 126 is implemented as a field programmable gate array (FPGA), although the black hardware may be implemented using one or more of a number of different hardware computing devices. Indeed, the software and hardware illustrated herein can be implemented in many different fashions, and is not limited to the software and hardware boundaries shown. That is, the functionality shown for the software can be implemented by hardware, firmware, software running a general purpose machine, etc.

In some embodiments, the identifier provided by the black software 122 is generated in the red software 120 and provided to the black software in the notification 121, which also indicates a change in transmission power. For example, in some embodiments, the red software 120 may use a series of identifiers, which in some embodiments is a bounded, rotating series. For example, some embodiments may use one through 15 as identifiers. When an identifier 15 is being used and a power change is determined as a result of receiving a notification 121, then the ID will be restarted at identifier 1. Thus, embodiments can rotate through various identifiers as PAR changes occur. The number of identifiers used may be determined by various factors including frequency of PAR changes as compared to feedback indicating signal and noise ratio from the receiver node 106 so as to ensure that there are a sufficient number of identifiers to prevent overlap or confusion ambiguities. Alternatively, other factors may be taken into account for determining the number of identifiers to be used.

The black hardware 126 then sends a request 132 for data from the red hardware 134. Note that the black hardware 126 may send multiple data requests per payload block. That is, the black hardware 126 may make several data requests that do not contain the identifier after receiving the identifier from the black software. On the next request for data that corresponds to the beginning of a payload block, the black hardware 126 will use the power and rate values that were latched into the PAR registers 128. The black hardware 126 sends the request with the identifier when it is the request for data that will immediately follow a data block header. The black hardware 126 also holds off on making the power and rate change associated with the identifier until the data block that immediately follows the header.

The request 132 includes the identifier provided by the black software. In particular, in some embodiments, the black hardware 126 will request data for the first FEC block following a header. As noted, the identifier is provided as part of the request 132. This allows the red hardware 134 to encode the identifier into an appropriately sized codeword according to the particular FEC scheme being used, which can be placed in a particular byte (i.e. a particular quantum of data) of data as appropriate, and then the data 136 including the encoded identifier can be provided back to the black hardware 126 for transmission to the receiver node 106. For example, in the embodiments illustrated herein, the codeword is placed in the first byte after the header 112. While in this example, the codeword is placed in the first byte, it should be appreciated that in other embodiments the codeword may be placed in a different byte so long as that byte is known and able to be used to convey the identifier to the receiver node 106.

Note, as described above, not every rate change will result in a new PAR interval requiring a new identifier. Rather, in some embodiments, PAR can be changed together in a fashion expected to produce a consistent SNR as previous data blocks in the same PAR interval, even though those data blocks are transmitted at different powers and rates. Thus, even though PAR may change, the transmitter node 104 may determine that subsequent data blocks are still within a given PAR interval and thus continue to use the currently used identifier. As a result, a new accumulation of SNR will not be triggered at the receiver node 106 by such events.

Figure 3:
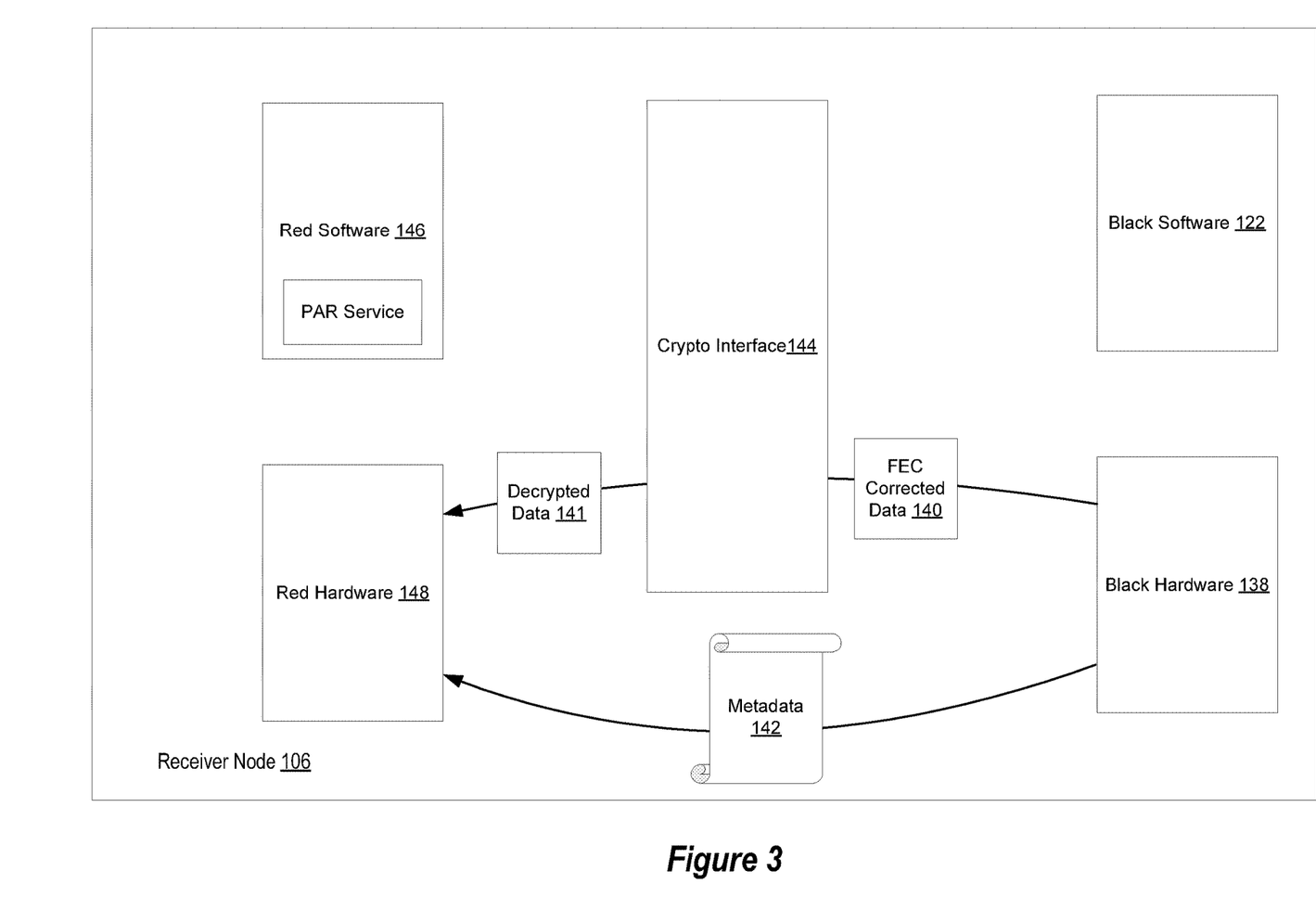
FIG. 3 illustrates a receiver node.

FIG. 3 illustrates additional details with respect to a receive side of an operation.

On the receiver node 106 side, the black side indicates to the red side when the beginning of a payload block occurs. The red side then inspects the appropriate field to determine the identifier, and includes the SNR results to the appropriate SNR average, based on the determined identifier.

For example, in some embodiments, the black hardware 138 sends FEC corrected data 140 and one or more metadata messages represented by message 142 including received rate, frequency, SNR, and a flag (when appropriate) to indicate that a particular decoded FEC frame includes the first byte following a header (when the first byte is used as the particular quantum of data 116), such as header 112 to the red hardware 148. As illustrated in FIG. 3, the data 140 is sent through the decryption engine on the data plane represented by the crypto interface 144 to create decrypted data 141 from the FEC corrected data to allow the identifier to be recovered.

The red hardware 148 receives the metadata 142 (which does not need to go through the crypto interface 144), including the flag indicating that payload data is the first FEC frame following a header 112. The red hardware 148 inspects the quantum of data that contains the identifier and removes it from the data stream. The red hardware 148 then accumulates the SNR based on the identifier. Note that as illustrated, the FEC frame is decoded by the black side. FEC decoding is performed before decryption. In some embodiments, there is another layer of FEC on the identifier, in which case the red hardware 148 on the receiver node 106 decodes the identifier FEC, as the red hardware 134 of the transmitter node 104 encoded the identifier FEC. In an alternative or additional embodiment, a cyclic redundancy check (CRC) may be performed. The CRC does not correct any errors, but it is used to detect the presence of errors. The presence of an error would signal the receiver node 106 to not use the following data in the SNR accumulation.

If a new identifier is encountered, a new SNR accumulation will be started. Note that a 'new identifier' does not require that the identifier be globally unique, but rather that the identifier be unique within some context. In the simplest example, the identifier may be unique based on being the next number in series encountered by the red hardware 148. Thus, for example, if the red hardware 148 has been consistently receiving payload blocks with identifier 13, a change to identifier 14 may indicate that a new identifier has been encountered. This may be true even though identifier 14 was previously encountered during a previous cycling through of identifiers.

Alternatively, determination that a new identifier has been encountered may be based on a time period since the number was previously encountered. For example, if data blocks are capable of being received out of order, that may result in various identifiers also being out of order. However, the system may be implemented such that when a sufficient amount of time has passed since a particular identifier was received, that the next instance of receiving the identifier represents a new identifier as part of a new PAR interval rather than indicating that the received data block is part of a previous PAR interval. This determination method may also require a certain number of different intervening identifiers to determine that a new identifier has been received. Indeed, in some embodiments, this may require a high percentage of possible intervening identifiers to have been received. Thus, for example, consider the case when 15 identifiers are implemented in a circular fashion such that the identifiers can be reused after the passage of a sufficient period of time and/or when other identifiers have already been used. Thus, for example, data blocks will be sent from the transmitter node 104 for a first PAR interval using identifier 1. As new PAR intervals are implemented at the transmitter node 104, identifiers may be cycled through for 14 additional PAR intervals, at which point identifier 1 will be recycled for the next PAR interval. Note that the receiver node 106 may not receive data blocks with one or more of the intervening identifiers due to a sufficient number of data blocks being lost. However, some embodiments may expect that some certain minimum percentage of data blocks will be received and/or that a sufficient number of identifiers will be received before re-encountering a given identifier and being able to classify that identifier is a new identifier. Alternatively or additionally, some embodiments may simply allow for a given period of time to occur between having received an identifier and receiving a new instance of the identifier to consider the new instance as being a new identifier for purposes of accumulating SNR information for particular PAR intervals.

The various SNR accumulations will be stored in persistent storage at the receiver node 106, or at some other convenient location. Thus, the red hardware 148 separates SNR measurements that are associated with differing identifiers from the payload data. SNR averages (and in some embodiments, minimums) will be stored for each SNR accumulation corresponding to a given PAR interval. When the receiver PAR service requests SNR values for each PAR interval, embodiments match the identifiers reported with the SNR to the corresponding received PAR messages. The red hardware 148 also separates SNR measurements that are associated with differing transmit nodes. The metadata 142 uniquely identifies the transmitter node associated with each FEC frame.

SNR accumulations are stored so that they can be requested by a PAR service of a node. The PAR service will need to know the order in which they were received, which can be accomplished by using the identifiers illustrated herein. When the receiver PAR service requests SNR values each PAR interval, it will match the ID Numbers reported with the SNR to the corresponding received PAR message.

In some embodiments, the red side software 146 also receives the control messages over a link between the transmitter node 104 and the receiver node 106. The red side software 146 can match the identifier in the control messages with the identifier received at the beginning of the payload block to provide additional feedback for other users in a mesh scenario. Note that this may not be necessary in a point-to-point scenario or when the additional information does not benefit other nodes. That is, using the identifier in the payload data along with the measured SNR is sufficient feedback for a point-to-point scenario.

Note that while various hardware and software have been described above, it should be appreciated that these illustrated elements are so divided to show one particular embodiment. That is, various combinations of software and hardware can be implemented to perform the functionality described above, and embodiments are not limited to the specific hardware versus software implementations described previously.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
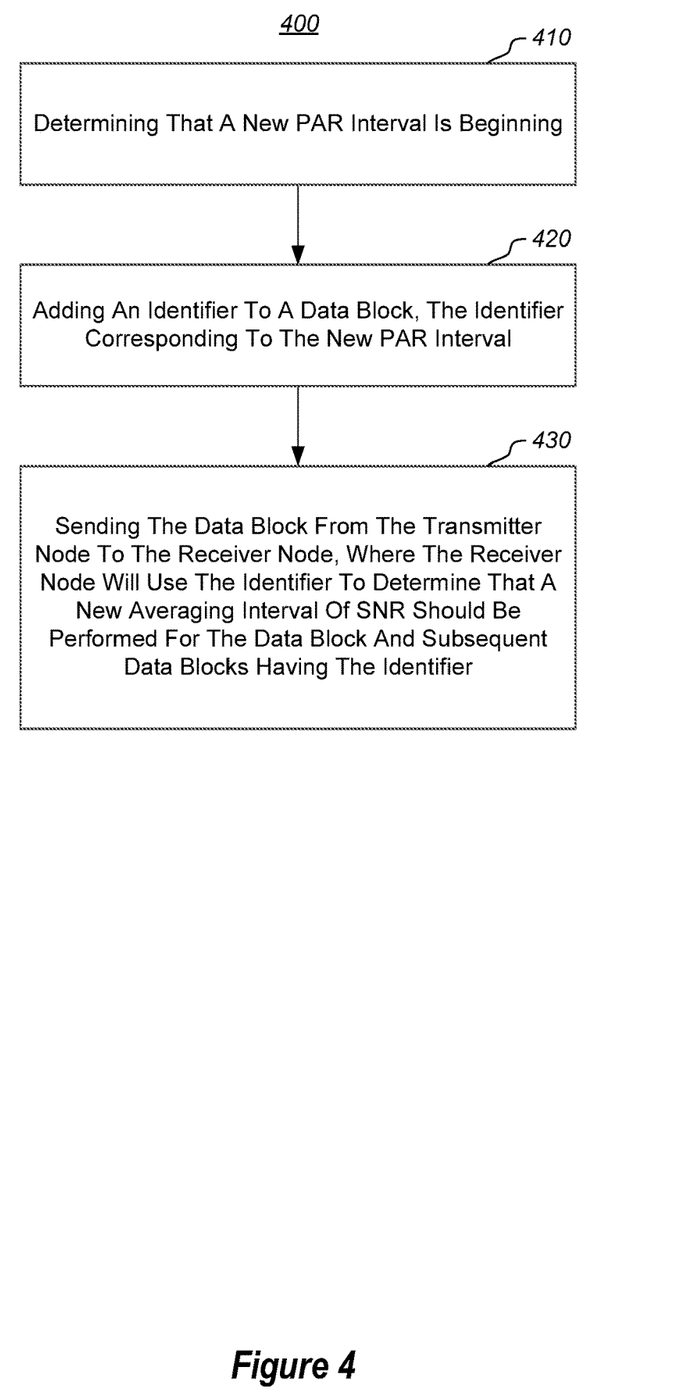
FIG. 4 illustrates a method of indicating to a receiver node in a network that the receiver node should begin tracking signal to noise ratio (SNR) of a received signal for a new power and rate (PAR) interval for data sent from a transmitter node.

Referring now to FIG. 4, a method 400 is illustrated. The method 400 includes acts for indicating to a receiver node in a network that the receiver node should begin tracking signal to noise ratio (SNR) of a received signal for a new power and rate (PAR) interval for data sent from a transmitter node. The method 400 includes determining that a new PAR interval is beginning (act 410).

The method 400 further includes adding an identifier to a data block, the identifier corresponding to the new PAR interval (act 420).

The method 400 further includes sending the data block from the transmitter node to the receiver node, where the receiver node will use the identifier to determine that a new tracking interval of SNR should be performed for the data block and subsequent data blocks having the identifier (act 430).

The method 400 may be practiced where adding the identifier to the data block includes adding the identifier to a header of the data block. In some embodiments, the data block header has variable length, and the presence of a data field is generally indicated by using a set of predefined flags. For example, a flag bit would be assigned for the identifier. If that flag is raised, then the identifier is added to the header. In these embodiments, it is not necessary to send the identifier with every data block. Rather, the identifier is included in the header when it changes.

The method 400 may be practiced where adding the identifier to the data block includes adding the identifier to a predetermined quantum of a payload block of the data block. In some embodiments, this may be performed where the predetermined quantum is the first byte in the payload block appearing after a header in the data block.

The method 400 may further include at a red side in the transmitter node generating the identifier and sending the identifier and a notification, through a crypto interface, to a black side in the transmitter node that the new PAR interval is beginning. At the black software at the transmitter node, the identifier, along with corresponding power and rate information, is provided to black hardware at the transmitter node. Note that in some embodiments, multiple powers can be provided with a single identifier, such as when multiple antennas are used in a transmitter node. As a result, at the black hardware at the transmitter node, a request is sent to red hardware at the transmitter node for data. The request includes the identifier. At the black hardware at the transmitter node, the data is received. The data has the identifier encoded in the data. The data is sent in the data block to the receiver node.

In some such embodiments, the method 400 may further include a crypto interface between the black side and the red side at the transmitter node encrypting the data before the data gets to the black side, including encrypting the identifier.

Alternatively, or additionally, in some such embodiments, the method 400 may further include the black hardware at the transmitter node covering the data with forward error correction coding, including covering the identifier.

Alternatively, or additionally, in some such embodiments, the method 400 may further include black hardware at the receiver node sending data to red hardware through a crypto interface at the receiver node, such that the data is decrypted by the crypto interface at the receiver node. The metadata includes a flag indicating that a particular FEC frame includes a FEC codeword which includes a particular quantum of data having the identifier. The red hardware at the receiver node decodes the FEC codeword to obtain the identifier. The red hardware at the receiver node accumulates SNR based on the identifier. In some such embodiments, the method 400 may further include the red hardware at the receiver node encountering a different identifier, and as a result, starting a new SNR accumulation. Alternatively or additionally, such embodiments may further include storing SNR accumulations at the receiver node where they can be provided to entities requesting the SNR accumulations.

The method 400 may be practiced where the identifier is selected from a bounded, rotating series of identifiers.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of indicating to a receiver node in a network that the receiver node should begin tracking signal to noise ratio (SNR) of a received signal for a new power and rate (PAR) interval for data sent from a transmitter node, the method comprising:
    determining to begin a new PAR interval, the new PAR interval being a period of time when data is sent from the transmitter node at a powers and rates projected to result in a target SNR at the receiver node;
    adding an identifier to a payload block of a data block, the identifier corresponding to the new PAR interval to identify that the payload block belongs to the new PAR interval in that it was transmitted from the transmitter node at at least one power and rate of the powers and rates projected to result in the particular SNR at the receiver node; and
    sending the payload block from the transmitter node to the receiver node, where the receiver node will use the identifier to determine that a new tracking interval of SNR should be performed for the payload block and subsequent payload blocks having the identifier.

2. The method of claim 1, wherein adding the identifier to the payload block comprises adding the identifier to a predetermined quantum of the payload block of the payload block.

3. The method of claim 2, wherein the predetermined quantum is the first byte in the payload block appearing after a header in the data block.

4. The method of claim 1, further comprising:
    at first software in the transmitter node generating the identifier and sending the identifier, power and rate corresponding to the identifier, and a notification to second software in the transmitter node, the notification indicating that the new PAR interval is beginning;
    at the second software at the transmitter node, providing the identifier to second hardware at the transmitter node;
    as a result, at the second hardware at the transmitter node, sending a request to first hardware at the transmitter node for data, the request comprising the identifier;
    at the second hardware at the transmitter node, receiving the data, the data having the identifier encoded in the data; and
    wherein the data is sent in the data block to the receiver node.

5. The method of claim 4, further comprising a crypto interface between second hardware and the first hardware at the transmitter node encrypting the data, including encrypting the identifier.

6. The method of claim 4, further comprising the second hardware at the transmitter node covering the data with forward error correction coding, including covering the identifier.

7. The method of claim 4, further comprising:
    second hardware at the receiver node sending FEC decoded data and metadata to first hardware at the receiver node, the metadata comprising a flag indicating that a particular FEC frame includes a FEC codeword which includes a particular quantum of data having the identifier;
    the first hardware at the receiver node receiving the FEC decoded data to obtain the identifier; and
    the first hardware at the receiver node accumulating SNR based on the identifier.

8. The method of claim 7, further comprising the first hardware at the receiver node encountering a different identifier, and as a result, starting a new SNR accumulation.

9. The method of claim 7, further comprising storing SNR accumulations at the receiver node where they can be provided to entities requesting the SNR accumulations.

10. The method of claim 1, wherein the identifier is selected from a bounded, rotating series of identifiers.

11. A transmitter node configured to indicate to a receiver node in a network that the receiver node should begin tracking signal to noise ratio (SNR) of a received signal for a new power and rate (PAR) interval for data sent from a transmitter node, the new PAR interval being a period of time when data is sent from the transmitter node at powers and rates projected to result in a target SNR at the receiver node the transmitter node comprising:
a first side;
a second side;
a crypto interface, wherein the first side is coupled to the second side through the crypto interface;
wherein the first software is configured to:
  generate an identifier corresponding to the new PAR interval to identify that a payload block belongs to the new PAR interval in that it was transmitted from the transmitter node at at least one power and rate of the powers and rates projected to result in the particular SNR at the receiver node;
  send the identifier to the second software;
  send power and rate corresponding to the identifier to the second software; and
  send a notification to the second software that the new PAR interval is beginning;
wherein the second software is configured to:
  provide the identifier to the second hardware;
wherein the second hardware is configured to send a request to the first hardware, the request comprising the identifier;
wherein the first hardware is configured to provide data to the second hardware, the data comprising the identifier; and
wherein the second hardware is configured to send the data, including the identifier to the receiver node, and wherein the second hardware is configured to send the identifier to the receiver node in a payload block of a data block.

12. The transmitter node of claim 11, wherein the crypto interface is configured to encrypt the identifier.

13. The transmitter node of claim 11, wherein the second hardware is configured to cover the identifier with forward error correction coding.

14. The transmitter node of claim 11, wherein the second hardware comprises registers for receiving the identifier from the second software.

15. The transmitter node of claim 11, wherein the transmitter node is configured to encrypt the identifier.

16. The transmitter node of claim 11, wherein the transmitter node is configured cover the identifier with forward error correction (FEC).

17. A receiver node configured to accumulate signal to noise ratio (SNR) of a received signal for a new power and rate (PAR) interval for data sent from a transmitter node, the new PAR interval being a period of time when data is sent from the transmitter node at powers and rates projected to result in a target SNR at the receiver node, the receiver node comprising:
a first side comprising first software and first hardware;
a second side comprising second software and second hardware;
a crypto interface, wherein the first side is coupled to the second side through the crypto interface;
wherein the second hardware is configured to send FEC decoded data and metadata to first hardware at the receiver node, the metadata comprising a flag indicating that a particular FEC frame includes a FEC codeword which includes a particular quantum of data having an identifier to identify that a payload block belongs to the new PAR interval in that it was transmitted from the transmitter node at at least one power and rate of the powers and rates projected to result in the particular SNR at the receiver node;
wherein the first hardware is configured to receive the FEC decoded data to obtain the identifier and the payload block; and
wherein the first hardware is configured to accumulate SNR based on the identifier.

18. The receiver node of claim 17, wherein the first hardware is configured to start a new SNR accumulation when a different identifier is encountered.

19. The receiver node of claim 17, wherein the first hardware is configured to store SNR accumulations at the receiver node where they can be provided to entities requesting the SNR accumulations.

20. The receiver node of claim 17, wherein the flag indicating that a particular FEC frame includes a FEC codeword which includes a particular quantum of data having an identifier indicates that a first byte following a header includes the identifier.

* * * * *